MEANS FOR ACOUSTICAL CORRECTION AND NOISE ABSORPTION

Filed June 25, 1953 3 Sheets-Sheet 1

INVENTOR
Wilfrid Paul Heath
BY
Albright Arnold
ATTORNEY

April 15, 1958 W. P. HEATH 2,830,330

MEANS FOR ACOUSTICAL CORRECTION AND NOISE ABSORPTION

Filed June 25, 1953 3 Sheets-Sheet 2

INVENTOR.
Wilfrid Paul Heath
BY
G. Wright Arnold
ATTORNEY

April 15, 1958 W. P. HEATH 2,830,330

MEANS FOR ACOUSTICAL CORRECTION AND NOISE ABSORPTION

Filed June 25, 1953 3 Sheets-Sheet 3

INVENTOR.
Wilfrid Paul Heath
BY
[signature]
ATTORNEY

United States Patent Office 2,830,330

Patented Apr. 15, 1958

2,830,330

MEANS FOR ACOUSTICAL CORRECTION AND NOISE ABSORPTION

Wilfrid Paul Heath, Richmond Beach, Wash.

Application June 25, 1953, Serial No. 364,056

22 Claims. (Cl. 20—4)

My invention and discovery relates to providing a method for controlling noise absorption and controlling acoustical correction and apparatus therefor.

More particularly my invention and discovery relates to the angularly disposition of sound absorbing members so that they will operate to substantially equate the sound absorption efficiency (Noise Reduction Coefficient (N. R. C.)) of the pair of lower with the pair of higher frequencies. That is, the sum of the noise reduction coefficient of 256 and 512 low frequency cycles is caused to be substantially equal to or greater than the sum of the 1024 and 2048 high frequency cycles.

It will be understood that these four frequencies comprise the sounds ordinarily encountered in conducting the affairs of daily living.

Still more particularly my invention and discovery relates to providing for such equating by means of a suspended sound interceptor in the form of a shallow box-like structure or in the form of a flat sheet of absorbing material as a mounting base for vertically or normally (90°) disposed members thereto.

By means of which disposition of the sound absorbing members I have discovered that the noise reduction coefficient of the two lower frequency cycles, 256 and 512, may be caused substantially to be made equal to or be greater than that of the two higher frequency cycles (1024 and 2048).

Also let it be noted that in the ordinary office or in ordinary living quarters, the common noises are predominantly in the lower two frequency cycles and also be it noted that these are the frequencies which carry the most power and therefore these are the frequencies which particularly should be rendered quiet or controlled. However, even the most expensive installations for absorbing noise of the presently employed common art such as the pad and perforated pan systems, are unable to quiet and overcome these low frequency cycles to the same extent or as effectively as they do the two higher frequency cycles. It is at this point that my invention and discovery is particularly advantageous because it does operate and function to substantially equate the efficiency of the higher and the lower frequency cycles. In short, my invention provides for a balanced sound correction. Intelligibility and clearness of speech depend upon such balance of sound absorption. Moreover, in musical interpretation, it is of the utmost importance that the lower frequencies with their greater power be properly absorbed or controlled in order not to overcome the high frequencies of the weak high notes of the violin, for example, and the piccolo. The very weakness of these high notes are absorbed by ordinary sound absorbing mechanism and structures but these commonly employed sound absorption means and structures do not, in the same proportion, provide for absorbing or controlling the loud powerful notes of the base drum, base viol, etc. This definitely results in musical distortion.

It is a primary and fundamental object of my invention to provide a structure which will overcome all of the defects above set forth and provide a balanced sound absorption mechanism.

Also it is a primary object of my invention and discovery to provide a ceiling structure which will function not only as a sound absorption means but also as a housing means for utilities and services such as germicidal lamps, humidfying trays, air circulatory fans, dust collecting, ozone means, deodorizers and odor supplying means and electrical power drops. The heated air, heated by the light means of the lighting fixture, provides a natural circulation.

A primary object of my invention is to provide a combination of acoustical controlled absorption means with a lighting fixture so that the acoustical means is supported in suspension from the means which ordinarily support the lighting fixture. This may be done by combining the controlled acoustical absorption means with the lighting fixture as a support for the same. Preferably I prefer to have the lighting fixture in the center of the unit of the acoustical means of my invention and discovery, that is, when my invention is employed and located in the ceiling of a room. Lighting fixtures of course are not ordinarily disposed in the side of a room but, if so, then the acoustical means could be mounted thereon.

Another fundamental and primary object of my invention and discovery is the providing of a two level or recessed ceiling which directly involves simplifying building construction. At the present time it is well known that on a ceiling there are often beams extending floorward and also many pipes must be carried along the ceiling for example, the pipes for water, pneumatic, electrical and air conditioning means, fire spray systems, etc. According to present common practice, the providing of an acoustical ceiling is accomplished by the providing of a separate completely independently constructed ceiling beneath the pipes, etc. involving expensive and extravagant construction in the employment of steel or aluminum, as well as costly labor, all of which inherently causes delayed construction, including also the waiting for the plaster to dry between coats. All this constitutes bottle-necks of construction and imposes the requirement of precise and nicety of synchronization of operations to provide efficient building construction.

Be it noted that such commonly constructed special ceiling involves a skeleton of heavy channel iron criss-crossed with lighter channel iron all supported ordinarily by wire drops from the floor above. To this metal skeleton the sound absorbing board, tile or pan means may be directly affixed. Or the construction may include the securing of metal lath to the metal skeleton in providing for the acoustical plaster coats.

In contrast, applicant's acoustical means eliminates such skeleton means and preferably suspends from or mounts his acoustical means upon the means supporting the light fixture and may use the light fixture as a part of his mounting means.

It is an object of my invention and discovery to provide for the installation of the same particularly for buildings already constructed as well as in newly planned buildings.

Also it is a primary object of my invention and discovery to have the acoustical means of my invention readily demountable and transportable for painting, repairing or cleaning, or for moving to new quarters. Thus, the acoustical means of my invention may be owned by the individual tenant and removed by him as the same is not attached to the building—its installation and its removal being such as to not mar or injure the already constructed ceiling, and the individual purchaser need not be discommoded for an extended period, as the acoustical means of my invention may be installed over night and thus protracted turmoil for the suspended ceiling is avoided.

Partitions in offices are frequently changed to meet the needs of tenants and it is an object of my invention and discovery to provide acoustical means characterized by being readily adapted to changes incident to said change of the partitions.

Also, it is a primary object of my invention and discovery to provide a one plane ceiling as well as a recessed ceiling—in both cases a suspended ceiling and this primarily by the lighting fixture supports or their equivalents.

A primary object of my invention and discovery is to provide for employing the mounting means of the light fixture and suspending the acoustical means on these and thereby cutting down all of the extra expense of providing a completely constructed sub-ceiling arrangement.

Also it is a primary object of my invention and discovery to provide not only for noise absorption but for acoustical correction.

Finally, it is a primary object of my invention and discovery to provide for increased efficiency in acoustical means and at the same time provide for extensive artistic designing for ceiling structure employing said acoustical means in so doing.

Furthermore, my invention includes the discovery that the control of the high frequencies such as 1024 and 2048 depends primarily upon the proportion of vertical area to the horizontal area, while the control of the low frequencies 128 depends primarily upon substantially increasing the proportion of vertical area to the horizontal over that provided for the high frequencies. Also it is an object of my invention and discovery to reduce the annoyance to nerves due to noise.

Sound, being a wave, it is reflected like light and reechoes off ceilings and walls until its energy is spent. Sound absorbing material reduces this annoyance to nerves but the arrangement of such material is important. It is an object of the present invention not only to improve the absorption of the sound comprising musical notes and noise but to do this in a manner which will correct sound distortion in speech and musical renderings.

The following considerations (taken from Theory and Use of Acoustical Materials prepared for Acoustical Materials Association by Paul E. Sabine, Ph. D. are fundamental to this invention and will aid in understanding as well as the need of this invention.

"* * * The difference in the sensation produced by a change in the frequency of vibration of the sound source is spoken of as a difference in pitch. * * *"

"* * * Psychologically defined, a musical sound is pleasing. A noise is not. Physically, a musical sound consists of a single definite frequency or a combination of simply and definitely related frequencies. Sound of a single frequency is spoken of as a pure or simple tone and is produced by a body vibrating in a single mode. The sound of a tuning fork is a common example. A string of the piano or violin vibrates as a whole and at the same time in segments producing a complex musical tone. The simple components of a complex tone have frequencies which are exact multiples of the lowest or fundamental frequency.

"The higher frequency components are called harmonics when they are exact multiples of the fundamental frequency or more generally overtones. The distribution and relative intensity of the overtones of a musical sound determines the quality or timbre of the sound. The difference which the ear recognizes between the tones of the same pitch and loudness from different musical instruments is a difference in quality. * * *

"* * * Physically, a noise differs from a musical sound in not having a definite frequency, or a series of simply related frequencies. A noise may produce a pitch sensation depending upon the particular part of the frequency range in which the vibrational energy is concentrated. A frequency analysis of the roar of a train crossing a trestle would show a peak of energy in the low frequency region. The screech of automobile brakes is in the high portion of the frequency spectrum. Complete knowledge of the nature of a particular noise involves an analysis that determines the distribution of the total acoustic energy over the range of audible frequencies.

"Acoustically, speech consists of a succession of mixed musical sounds and noises. Vowel sounds are essentially musical sounds. Each vowel has a characteristic set of overtones given by the shape of the mouth cavities in producing it. The overtones that distinguish the various vowels lie in the frequency range from 200 to 3000 C. P. S. Consonant sounds are characteristic noises produced by the positioning and movements of the lips and tongue in speaking. The fundamental tone of the speaking voice is determined by the rate of vibration of the vocal chords and normally has a frequency in the neighborhood of 125 C. P. S. for men's and 250 C. P. S. for women's voices."

"* * * Intensity is defined as the power in watts that is transmitted across one square centimeter of the wave front perpendicular to the direction in which the sound is traveling." (Pp. 4, 5.)

"* * * A 100 cycle tone that is barely audible has about 5000 times the intensity of a 1000 cycle tone that is equally loud, i. e. barely audible, whereas 100 cycle and 1000 cycle tones would sound equally loud at a 100 decibel level. * * *" (P. 8.)

"In computing the reverberation time of auditoriums the absorption coefficients at the single frequency 512 C. P. S. is used. In rating the effectiveness of absorbents in reducing room noise, it is common practice to use the average of the coefficients at 256, 512, 1024 and 2048 C. P. S. This average has been termed the Noise Reduction Coefficient." (P. 12.)

"Since the absorption coefficients of materials are different at different frequencies, it follows that the reverberation time of a given room will depend upon the pitch of the sound, and that, theoretically at least, the variation with frequency of the absorption coefficient of any material will have an effect upon the acoustic properties of a room in which it is used. It is a common practice to consider the reverberation only at the single frequency of 512 cycles per second. No very definite criterion for reverberation times at other than 512 cycles has been established, but experience shows that in an auditorium with a large area of material having a coefficient at high frequencies several times as great as that at 128 cycles, a preponderance of low pitched sound results which is not pleasing. The importance of considering the coefficients at different frequencies is apparent, in cases such as broadcasting studios in which the artificial absorbent supplies most of the total absorption. In rooms where only a small portion of the total absorption is supplied by the acoustical material, this factor may be unimportant. This is the case in auditoriums generally. Here the absorption of the audience furnishes so large a part of the total absorption that the effect of the introduction of acoustical treatment on the reverberation frequency characteristic is negligible. * * *" (P. 14.)

"Disturbing sounds even at low intensity levels may seriously lower the intelligibility of speech in an auditorium. This is particularly true in cases where the intensity level of the desired sound is comparatively low. Outside traffic noise, noise from machinery outside the room, such as ventilating fans, circulating pumps, electric motors and the like, frequently cause complaints on the score of poor acoustics regarding rooms that are otherwise acoustically good. * * * * " (P. 14.)

The above mentioned general objects of my invention together with others inherent in the same are attained by the mechanism illustrated in the accompanying drawings, the same being preferred exemplary forms of the embodiment of my invention throughout which drawings like reference numerals indicate like parts:

Figures 1, 2, 3, 4, 5, 26, 26A, 27, 28:
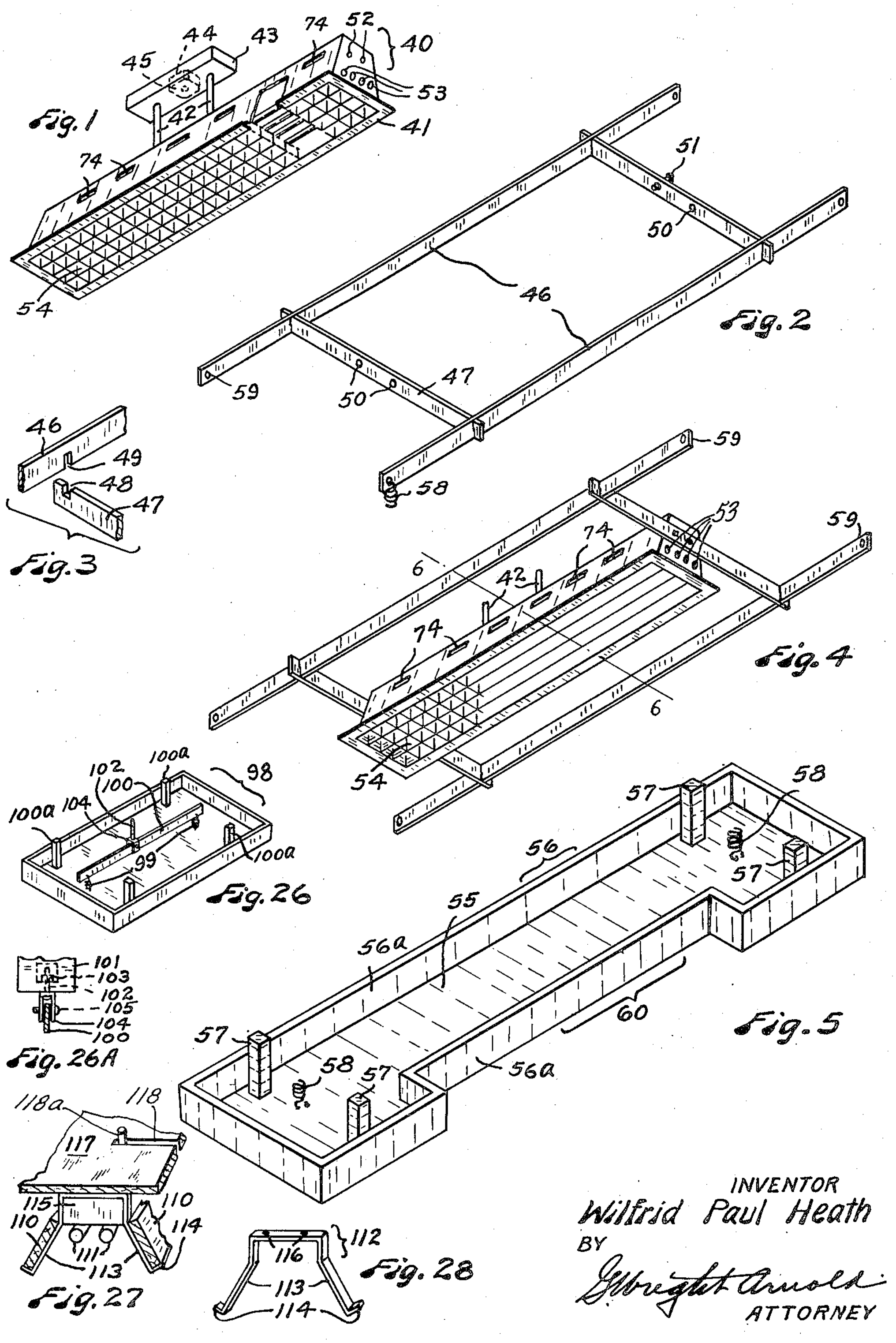
Figure 1 is a view looking upwardly in perspective of a lighting fixture and commonly employed suspension rods or hangers extending from the ceiling outlet boxes and on which fixture the present invention ceiling structure is mounted.
Fig. 2 is a view in perspective of the mounting frame (one feature of my invention) to be bolted upon the end of the fixture, on which frame the acoustical or other ceiling structures of my invention are mounted.
Fig. 3 is a view in perspective of a detail of Fig. 2, namely the interlocking engagement of the frame members.
Fig. 4 is a view looking upwardly in perspective of the lamp fixture with the said frame mounting secured thereto.
Fig. 5 is a view in perspective of a device embodying my invention in the form of a shollow box-like structure formed of sound absorbing material.
Figures 7, 8, 9, 10, 11, 12, 13:
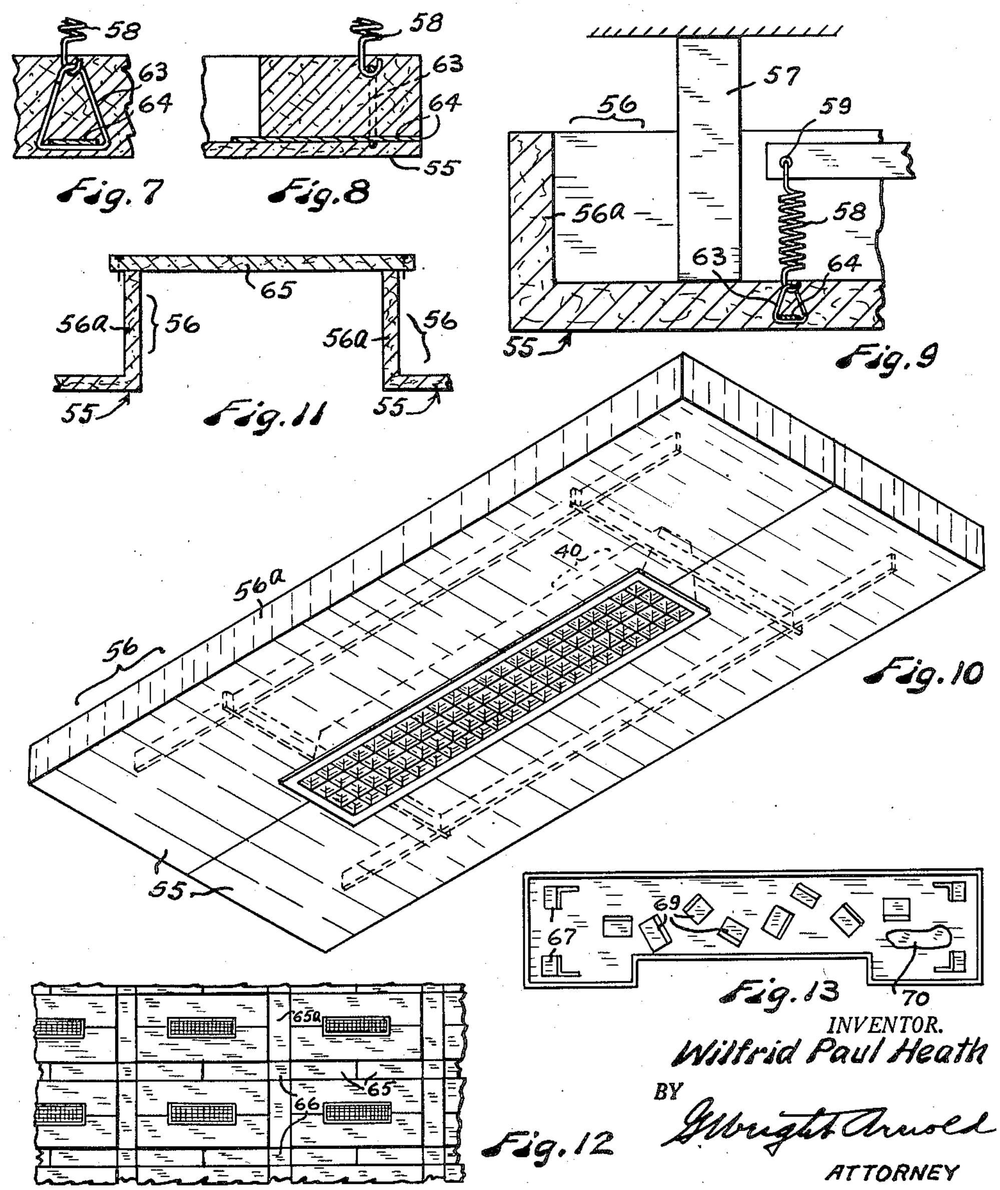
Fig. 7 is a view in section showing the support means for engaging the panel of fibre glass by an imbedded metal bracket or stirrup and a portion of the spring which holds and supports.
Fig. 8 is a view in longitudinal section of the support means shown in Fig. 7.
Fig. 9 is a view partly in section of the support means engaged by a spring attaching the same to the mounting frame with the spacer member holding the structure against the ceiling.
Fig. 10 is a view looking upwardly in perspective of the shallow box-like structures mounted on the mounting frame which in turn is mounted on the lighting fixture.
Fig. 11 is a view of two adjacent shallow box-like structures with a panel disposed across their top edges in completing a section of the recessed ceiling.
Fig. 12 is a section of a ceiling looking upwardly at a plurality of suspended box-like structures with the panel disposed across their upper edges as shown in Fig. 11 in illustrating a recessed ceiling pattern.
Figure 14:
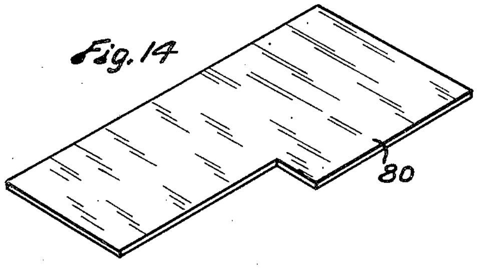
Figure 15:
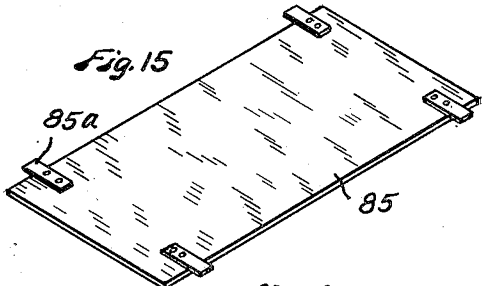
Figure 16:
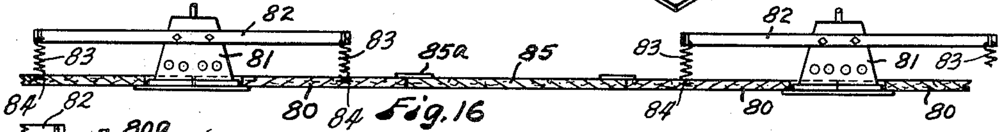
Figures 16A, 18:
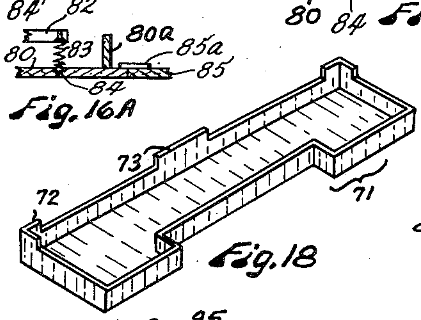
Figure 17:
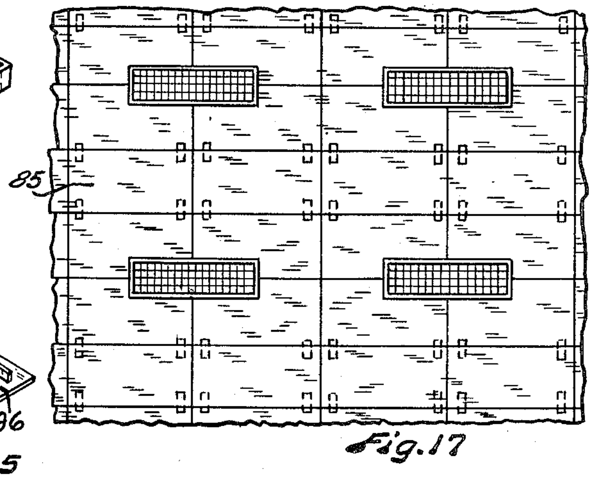
Figures 24, 25:
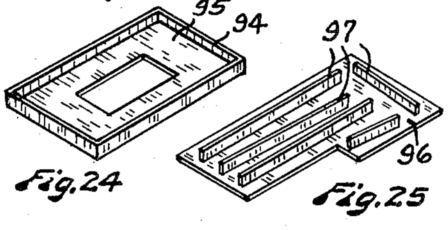
Figures 19, 20, 22:
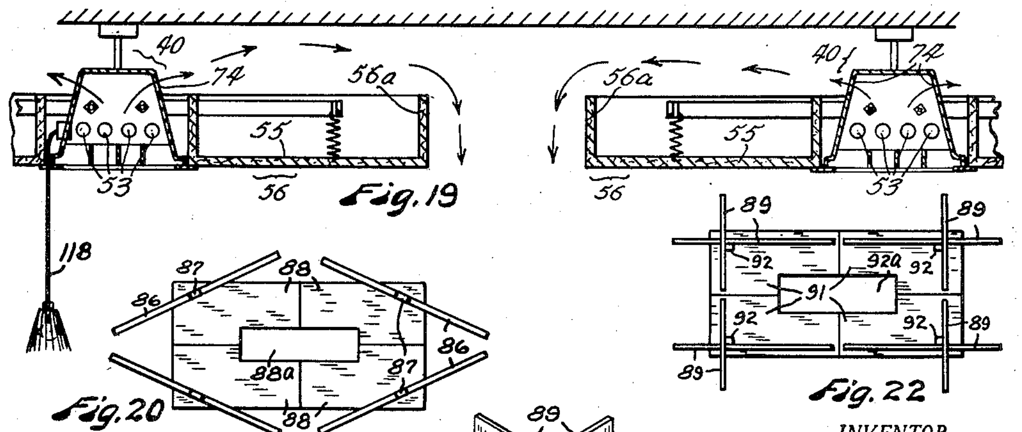
Figure 23:
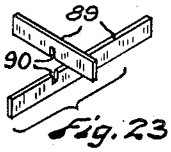
Figure 21:
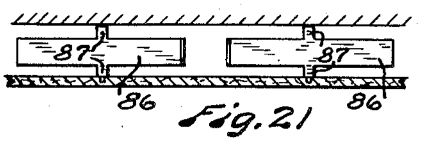

Fig. 13 is a view looking downwardly within a shallow box-like structure of sound-absorbing material provided with spacing posts in the form of right angles and with posts intermediate the length of the box-like structure, thus providing for maintaining the bottom side of the box-like structure in one plane. Also there is shown upright sound-absorbing members disposed at various angles to themselves as well as to walls of the box-like structure;

Fig. 14 is a view in perspective of a panel constituting one of four panels to be mounted on a lighting fixture in the forming of a single plane ceiling;

Fig. 15 is a view of an intermediate panel with mounting means on its lateral edges to be disposed between the panels of Fig. 14 in forming the single plane ceiling;

Fig. 16 is a view in cross section of the panels of Fig. 14 and Fig. 15 mounted on the light fixture in forming a single plane ceiling;

Fig. 16A is a view in cross section of a modified form of the structure shown in Fig. 16;

Fig. 17 is a view of the ceiling of one plane looking upwardly showing the general pattern with supporting bridging means on back side in dotted line 5;

Fig. 18 is a view of a modified form of the shallow box-like structure of my invention having the spacer posts formed integrally with the said structure;

Fig. 19 is a view in section of lighting fixture suspended from the ceiling and in cross section of adjacently disposed shallow-like boxes of acoustical material of my invention illustrating the circulation of air through the lighting fixture across the box-like structure and then down between said box-like structure when no recessed panel is employed;

Fig. 20 is a view of an assembly of four panels about a lighting fixture looking upwardly at the assembly with vertical walls disposed on pivotal members, the pivot being the spacing post and said vertical members extending beyond the periphery of the horizontal panels;

Fig. 21 is a view in side elevation of a horizontal panel provided with a modified form of vertical walls, the same being pivoted at their center and the center pivotal portion functioning as a spacing post for the panel;

Fig. 22 shows in perspective a modified form of the vertical walls;

Fig. 23 is a view in perspective of the securing of vertical walls 89 of Fig. 22 (in Fig. 22 the end walls extend beyond the panel members 91, which is not the case in Fig. 3. It is not clear from Fig. 22 how these vertical walls are engaged and so Fig. 23 was set forth to make this positively clear. In Fig. 3 members 46 and 47 are of metal while in Fig. 23 the parts 89 and 90 are fibreglass);

Fig. 24 is a view in perspective of a modified form of the shallow box-like structure in one piece ready to be mounted upon a light fixture;

Fig. 25 is a view in perspective of another modified form of a panel member of Fig. 14 showing the vertical members set at varying angles upon the horizontal panel;

Fig. 26 is a view in perspective of a modified form of the shallow box-like structure of my invention mountable on the lighting fixture outlet box without any lighting fixture associated with the said box-like structure;

Fig. 26A is a view in cross section of the lighting fixture outlet box and bolt means for engaging the mounting bar of the structure shown in Fig. 26;

Fig. 27 is still another view in perspective of a modified form of my invention wherein the panels or boards of sound absorbing material are employed as a reflecting area for the light of the light fixture, the horizontal panel or board of sound absorbing material being disposed on top of the lighting fixture housing; and Fig. 28 is a view in perspective of the bracket mounting means securable to the lighting fixture housing and on the arms of which are supported the light reflecting sound absorbing panels or boards.

In Figure 1 the lighting fixture 40 has a circumbasal lip and also has the suspending rod 42 or hangers 42 extending through concealer box 43 beneath which is the outlet box 44 with its plate 45 to which are secured the rods or hanger members 42. The parts so far described constitute the suspension means for the acoustical means of my invention and discovery. That is, such suspension means will be the one normally found already installed. If desired, separate suspension rods in the ceiling may be mounted for suspending the structure of my invention without the lighting fixtures.

In Fig. 2 the longitudinal mounting member 46 and cross member 47 illustrate the rectangular mounting frame of my invention.

In Fig. 3 the intersection of member 46 with 47 is illustrated and shows the preferred arrangement of the notch 48 in the member 47 supporting and engaging the notch 49 in the member 46. Holes 50 in the cross members 47 are for the purpose of mounting by means of a bolt 51, the said cross members in the holes 52 located in the end of the lighting fixture 40.

In Fig. 4 the rectangular mounting frame is shown secured to the lighting fixture 40. The fixture 40 has a normal lighting means, in this case illustrated as gaseous tubes 53 with the commonly employed grill 54. Such lighting means creates the heat which forms the circulation of air and provides for the device of my invention to operate as a dust collector and air circulator. The air rises about the tubes and after being somewhat condensed as it passes up past the tubes 53, it passes through the opening 74 in the upper part of the fixture 40 and then spreads out over the top of the box-like structure next to be described and losing its velocity drops the dust.

A prefabricated box (Fig. 5) embodying my invention, has a horizontally disposed plane or panel 55, with a vertically disposed plane or wall, both the panel and said wall being formed of sound absorbing material.

The spacing posts 57 are preferably disposed in each corner of the structure, shown in Fig. 5, and these operate to maintain an automatic means for having the box uniformly mounted in spaced relation to the ceiling. Spring members 58 operate to hold the box against the ceiling. These spring 58 are connected to the box by means hereinafter set forth, and are hooked into the mounting frame as respects holes 59.

The shallow box-like structure 56 illustrated in Fig. 5 has the cutout portion 60, which provides for the reception of the lighting fixture 40; that is, the circumbasal lip 41 engages the edge of the box-like structure, which has just been described. This engagement of the circumbasal lip 41 of the lighting fixture, with the central portion 55 of the box-like structure 61, is illustrated in Fig. 6.

Figure 6:
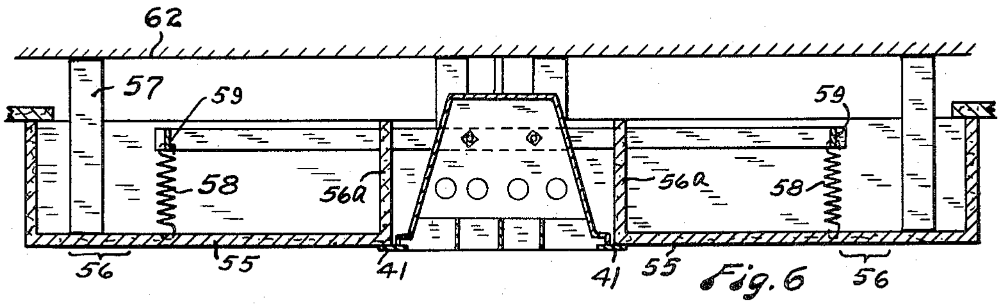
Fig. 6 is a view in cross section through the center, that is, on dotted line 6—6 of Fig. 4 showing the fixture with the frame mounted thereon and with the acoustical shallow box-like structure supported by said frame by means of springs operating to pull the said acoustical box-like structure towards the ceiling held in spaced relation to the ceiling by means of spacing posts.

In Fig. 6 there is also illustrated the spring member 58 engaging the hole 59 in the end of the hounting frame, and also engaging the panel 55, in supporting the panel. Also there is illustrated the post 57, held against the ceiling 62 against the tension of the spring member 58 thereby leveling the box-like structure and placing the panel 55 in one plane with other similarly mounted shallow box-like structure 56.

A supporting wire-like stirrup 63 may be of triangular form (Fig. 7) which may be pressed into the fiber glass to within a short distance of its lower face. A short blade-like member 64 may be pressed into the fiber glass panel 55 at an angle and cause to extend through the triangular supporting stirrup 63. Spring member 58 is caused to hook into the triangular member 63. This has been found to give an exceptionally strong and substantial supporting or securing means. The securing bracket formed by the supporting members 63 and 64 is preferably located in spaced relation to the marginal edge of the panel 55. However, if desired, the blade-like member may be pressed in from the edge of the panel 55 as shown in Fig. 8.

In Fig. 11 the modified form of arrangement of adjacently disposed shallow-like box structures 56, shown only in part, are connected at the top by a horizontal panel member 65. Thus is provided a recess or two-plane ceiling.

In Fig. 10, the box-like structures 56 are shown mounted upon light fixture 40, and also upon mounting frame member formed of members 46 and 47—the mounting frame member shown in dotted line, as same is on the opposite side of the panel 55.

In Fig. 12 six of the structures 56 shown in Fig. 10 are shown in adjacent position with the bridging member 65 disposed therebetween resting on the upper edges in forming the recessed ceiling. A possible pattern of the ceiling is illustrated in Fig. 12. The connecting panels 65 may be of a dimension which permits them to extend across or bridge the width of the assembly of two of the shallow-like boxes 56 and, as respects the length of the shallow boxes, it may require two such joining panels 65 and end bridging panels 65*a*. This would leave squares at the corners to be filled by a separate panel 66 and thus a uniform patter form may be established for the ceiling.

In Fig. 13 there is shown a modified form of the spacer posts, said posts being 67 and of triangular form. In Fig. 13 there are also shown vertical upright members 69, to augment the vertical walls 56, in assisting in the sound absorption—said members being either fixed or loosely placed upon panel 55. Another form also of assisting in said sound absorption is the introduction of a muslin sack 70 of scrap pieces of sound absorbing material, loosely layed upon panel 55.

In Figs. 14, 15, 16 and 17 we have the illustration of modified form of the orthodox one plane ceiling, adapted to be suspended on the light fixtures, without the ordinary, commonly employed, specially expensive elaborate steel skeleton structure for mounting a separate ceiling.

In Figs. 14, 16 and 16A we have one panel 80 of sound absorbing material which may form one member of a group of four to be disposed about a lighting fixture 81. These panels are suspended from a mounting frame 82, said mounting frame being constructed in all respects like the mounting structure described above, composed of members 46 and 47, on which mounting frame is secured the springs 83, which are in turn secured to supporting means 84 in the panel 80, said supporting means being of like character and structure to that shown in Figs. 7 and 8. Between assemblies of said panels 80 there would be mounted panels 85, which bridge the gap between panels mounted on adjacent light fixtures. Panel 85 with its clips 85*a* is shown in Fig. 15, and in position in Fig. 17, along with the other panels mounted and carried by the light fixtures—Fig. 17 showing the general pattern of a one plane ceiling. In this form of my invention; that is, the one plane ceiling, the advantage of the suspension from the light fixtures is retained, with all of its economy and functional relationship with the light fixtures themselves. The advantage of the vertically disposed plane of sound absorbing material may be had in this form of ceiling by providing members 80*a*, Fig. 16A, the same being fixed or layed upon the member 80.

In Fig. 18 we have a modified form 71 of the shallow box-like or tray-like structure of sound absorbing material. In this form the spacing posts 72 are formed integral with the vertical walls of the box-like structure which may also have the intermediate post 73.

In Fig. 19 there is shown diagrammatically the circulation of the air between adjacent box-like structures of my invention. The heat created by the lighting means or tubes 53 in the fixture 40 causes the heated air to rise. The air will pass through slots 74 which may be provided in the light fixture. This circulation of air will obviously rise wherever the heat is strongest; that is, up into the light fixture 40 itself and then the air, being heated by the lighting means 53, the air rises, and passes through the slots 74, and then immediately this volume of air, which is confined within the fixture, proceeds to spread out over the box-like structure, and it will be deflected from the ceiling against the vertical walls 56*a* of the shallow box-like structure 56 and against the bottom 55 of the shallow-like structure 56. This air, of course, will be then traveling at the reduced rate due to its spreading out, and any dust that it may be carrying will be caused to drop substantially within the box-like structure 56. The air current will then proceed to descend between the box-like structures and recirculate in the room.

In Figs. 20, 21, 22 and 23 a modified form of the box-like structure, or of the form of my invention having horizontal and vertical walls is shown. In Fig. 20 the vertical walls 86 are shown mounted on a spacer post 87 and said vertical wall members are of a length which causes them to extend beyond the periphery of the horizontal plates 88. In this wise the spacer posts 88 are employed to function in two ways; namely, as a mounting means for the vertical members 86, and also as a spacer post. Manifestly these vertical members 86 may be disposed to form various designs; for example, as illustrated, a figure of a diamond-like shape. In Fig. 21, a side view is shown of vertical members 86, and shows that they are disposed in spaced relation with the horizontal member 88, thereby admitting freely sound waves within the box-like or tray-like structure. Opening 88*a* is for receiving the lighting fixture on which it is to be mounted.

In Figs. 22 and 23 still a further modified form of my invention having vertically disposed members 89, interlocking at 90, forming a unitary structure is shown. These members may be disposed on top of a horizontal panel member 91 which have posts 92 operating as spacer posts with respect to the ceiling, thereby providing automatically for a uniform spacing of the panels from the ceiling. Opening 92*a* is for receiving a light fixture. These members 89 and 90 are purposely caused to extend beyond the periphery of the panels 91 in order to augment the vertical surface for sound absorption in comparison to the horizontal.

In Fig. 24 there is shown a modified form of my invention comprising a pressed out one piece box 93. This has vertical and horizontal walls 94 and 95 respectively. This form of my invention is particularly adapted for smaller units for the kitchen and bathroom, etc. but of course is a structure which may be followed or duplicated in large units.

In Fig. 25 there is illustrated a panel 96 which may correspond to panel 80 of Fig. 14 on which panel there is disposed vertical walled members 97 which are loose and can be set in upon the panel 96, being disposable at any angle that may be desired to give greatest efficiency in the sound absorption. Any number of such units as may be desired may be placed upon the panel and thereby provide for the particular conditions for sound absorption in any given or special instance or field of use.

In Fig. 26 a further modified form is shown of the tray-like or shallow box-like structure of sound absorbing material of my invention. This form comprises a said box-like structure 98 resiliently mounted on springs 99 corresponding to 58, secured to bar 100 which in turn is secured to an outlet box 101 Fig. 26A by an adjustable bolt 102 and nut 103 engaging a U shaped member 104 and pin 105. This provides a simple and economical structure, the box or tray-like structure following my invention as to proportions of sound absorbing material disposed in horizontal and vertical planes as in the case of the other said shallow box-like structure herein disclosed. Said box 98 is preferably held in spaced relation to the ceiling by spacing posts 100*a* in all respects similar to posts 57 of Fig. 6, said posts not being repeated in said Fig. 26.

In Figs. 27 and 28 a modified form of my invention is shown, wherein the vertically disposed sound absorbing panels 110 also function as reflector means for the tube lighting means 111. A simple bracket 112 having arms 113 with turned up flanges 114 is disposed on the ends of a lighting fixture ballast housing 115 by screws (not shown) which may extend through openings 116 in said bracket. On the arms 113 said panels 110 are mounted. Across the top of the said box 115 is disposed the horizontal panel 117, said panel having openings 118 for hanger members 118*a* (identical with members 42 in Fig. 1) to secure said box 115 to the ceiling, the ratio of the areas of said reflecting panels 110 to the horizontal panel 117 being that of the invention herein set forth. This form of my invention eliminates the expensive use of metal as a reflector for the lighting means—it being one of the fundamental purposes of my invention throughout to eliminate all of the expensive metal mounting and metal framework possible. This structure is characterized emphatically by its economy of manufacture and saving of expense over present designs.

In a sound reverberation absorption test two shallow box-like structures were employed disposed side by side similar to the arrangement shown in Fig. 10 to form what is referred to in these tests as a unit. Each member of said unit comprised a shallow box-like or tray-like structure similar to that shown in Fig. 5 with the exception that the vertical wall surrounding the lighting fixture was omitted together with the parts at the ends of the opening; that is, the wall from one end of the box-like structure to the other was entirely omitted on the side of the structure next to the light fixture. In order to restate this, only the outside or circumferential or visible vertical wall of the units was employed. Each of the box-like structures was formed of fiber glass one inch thick and of a density of 9.4 pounds per cu. ft., each box having the further dimensions of: 8 ft. long, 2½ ft. wide and 6 in. deep outside measurement.

In describing the tests, the area of the 8 ft. boxes totaled in said tests 49 sq. ft. of area, some 13 sq. ft. or 26½% being in the vertical and some 36 ft. or 73½% being in the horizontal (the lighting fixture recess being subtracted from the over-all horizontal area. This recess for each box is 4 ft. long and ½ ft. wide; that is, when the two 8 ft. boxes were placed side by side as shown in Fig. 10 there is a structure 8 ft. long and 5 ft. wide surrounding the light fixture, the opening of which is 4 ft. long and 1 ft. wide.

In the table below there will be a line of 49 sq. ft. for the 8 ft. box. There also will be a line for a 50 sq. ft. or two 4 ft. halves of said unit. This is to be explained as follows: The unit as a whole with its two 8 ft. boxes was divided into two halves; that is, the 8 ft. dimension of the unit was divided in two; i. e. the old width of the unit being the same; namely 5 ft. each of the halves being the same, and having a lighting fixture opening 4 ft. long and 1 ft. wide.

On the line of division of each half unit the vertical wall of the sound absorbing material was supplied so that each half unit was surrounded by a vertical wall making it 18 lineal feet and ½ ft. high. The halves were then moved apart 2 ft. in opposed position with their horizontal faces in the same plane with a total for each half unit of 9 sq. ft. in the vertical and 16 in the horizontal, making a total for both half units of 18 sq. ft. in the vertical and 32 ft. for the horizontal, the two recesses being subtracted.

Table I shows the results of the sound absorption for the frequencies set forth, the first line of the table being for the plain flat fiber glass panel as commonly employed in the ceiling, the said fiber glass being of the same description as set forth above.

*Table I*

| Sound Frequency Cycles | 128 | 256 | 512 | 1,024 | 2,048 | 4,096 | N. R. C. | | Industrial Rating |
|---|---|---|---|---|---|---|---|---|---|
| 49 sq. ft. Fiberglass flat to ceiling | .10 | .28 | .69 | .81 | .76 | .90 | .65 | or | .65 |
| 49 sq. ft. 8 ft. | .28 | .77 | 1.00 | .77 | .81 | .90 | .8375 | or | .85 |
| 50 sq. ft. (2) 4 ft. Assemblies | .51 | .77 | .98 | .79 | .79 | .90 | .8325 | or | .85 |

From the above, the table indicates determinations of very remarkable improvements over the determination for flat to ceiling fiber glass. For the 128 frequency cycle it will be noted that the absorption for flat to ceiling for corresponding areas was 10 percentage of absorption whereas for the two assemblies separated as above described, there is the remarkable figure of 51%; that is five times the absorption of present day practice in the shallow box-like structures of my invention. It will be noted that the frequency of 100 cycles is 5,000 times more powerful than the cycles of 1,000 frequencies as set forth above in the extract from Mr. Sabine's text. It will be noted that he stated that there are many unpleasant results due to the low frequency noises.

With regard to the cycles of 256, 512, 1024 and 2048 it will be noted that a bracket has been placed around these. This is due to the fact that these are the four frequencies which make up the noise reduction coefficient as used in the industry and is standard. I pair the results of the 256 and 512 cycles because these cycles are considered low frequency cycles and I pair the 1024 and 2048 cycles because they are considered the high frequency cycles. These four cycles are those which are most commonly involved in conducting ordinary affairs and are the four cycles which are commonly accepted as the cycles so involved in ordinary affairs.

By my invention it will be noted that the lower pair of frequency cycles in the 8 ft. assembly amount to 1.77 and this more than equates the 1.58, the same being the sum of the two high frequencies 1024 and 2048.

This is a unique and novel result in that the industry at the present time does not even approach any figures which, if added together, approximates an equating. The idea of equating is a part of my invention.

Considering the 50 sq. ft. involved with the two 4 ft. assemblies it will be noted that the sum of the pair of the low frequency cycles amounts to 1.75 as opposed to 1.58 for the pair of high frequency cycles 1024 and 2048. Thus again my invention shows a constant for this relationship. In other words, whether you have a long 8 ft. assembly or whether you split it in halves, there is the constant relationship for the pairs of the lower frequency cycles 256 and 512 as opposed to 1024 and 2048 frequency cycles.

The 4096 frequency cycle showed a constant .90 for all three cases. This is the frequency cycle substantially involved in the weaker high frequency cycles.

The following table sets forth the efficiency of the product or acoustic systems now on the market, the figures being taken from the reports of the Acoustical Materials Association, said reports being standard for all members of the association which comprises all of the major companies.

For purposes of comparison the acoustical systems of five of the major companies are set forth as follows:

*Table II*

| Half-Inch Perforated Tile or Unit | Sum lower pair 256 and 512 | Sum higher pair 1,024 and 2,048 | Percent equated |
|---|---|---|---|
| Company: | | | |
| A | 0.74 | 1.53 | 48 |
| B | 0.76 | 1.47 | 52 |
| C | 0.86 | 1.39 | 62 |
| D | 0.79 | 1.60 | 49 |
| E | 0.83 | 1.60 | 52 |
| Average for half-inch perforated tile or square | 0.79 | 1.52 | 52 |
| Pad and Pan (Absorbing Pads and Metal Facing): | | | |
| A | 1.55 | 1.76 | 90 |
| B | 1.51 | 1.80 | 84 |
| C | 1.54 | 1.82 | 85 |
| D | 1.44 | 1.87 | 72 |
| Average for pan-and-pad systems | 1.51 | 1.81 | 84 |
| Suspended Fiberglass of applicant in one plane | 1.27 | 1.76 | 72 |
| 49 sq. ft. one Podium, 8' long x 5' wide x ½' deep | 1.77 | 1.58 | 112 |
| 50 sq. ft. 2 podia or units 4' long x 5' wide x ½' deep | 1.75 | 1.58 | 111 |

The above table shows that only in my invention does the sum of the pair of low frequencies in any wise approach the sum of the pair of higher frequencies and applicant even goes beyond the sum of the pair of high frequencies; that is, applicant provides for having the sum of the lower frequencies 256 and 512 to more than equal the sum of the pair of higher frequencies 1024 and 2048. Thus my invention achieves a sound correction which is practically or substantially equated, in fact the results more than equate and on the right side. This is true because the low frequencies have the power and have not been controlled heretofore. This provides a desired goal for speech intelligibility and for correct musical interpretation which has been long sought. From the table it appears in order for a customer to enjoy the increased average to even 84% equating of the pan and pad system instead of the 52% of the ½" perforated tile, it is well known that the cost is from four to seven times as much for the pan and pad system as for the perforated ½" tile.

Thus it appears from the various forms of my invention that it is characterized by the elimination of all ceiling supports other than lighting fixture outlets; that is, all the expensive, elaborate steel framework of present day practice to form the framework on which acoustical mountings are made. However, if one desires to employ wire hangings to hold up the framework on which my mountings are made such as shown in Fig. 2, of course the other advantageous features of my invention may be had. My invention is further characterized by its demountability and transportability so that the owner of the same may move his acoustic means to another and separate office without any disfiguring or remodeling of the ceiling. It also operates as a means for concealing utility matters like announcing systems or circulatory fans and water evaporator or humidifiers or power drop such as 118.

Also my invention provides for the removal of dust from the air and provides for doing this continuously and also my invention provides for the substantial equating of the low frequencies as paired with the high frequency cycles and it provides for the controlling of the low frequency 128 frequency cycles, a consideration which at the present time is practically omitted. So true is this that the practice is to consider only the frequency cycles of 256, 512, 1024 and 2048 in computing the noise reduction coefficient.

I claim:

1. The controlled noise absorption and acoustical correction open panel structure comprising sound absorbing material assembled in the form of a base panel member with other members disposed angularly thereon normally to the plane of said base member, said other members having at least two faces, the area of the base panel member being greater than that of the other members, substantially all surfaces of all of which members throughout their area on both their sides being directly exposed to the direct impingement thereon of sound waves, direct and reflected.

2. The controlled noise absorption and acoustical correction open panel structure comprising sound absorbing material assembled in the form of a base panel member with other members disposed angularly thereon normally to the plane of said base member, said other members having at least two faces, the area of the base panel member being characterized by a ratio in the range of 60% to 85% and the area of the other members being characterized by a ratio in the range of 40% to 15%, substantially all surfaces of all of the members throughout their area on both their sides being directly exposed to the direct impingement thereon of sound waves, direct and reflected.

3. The controlled noise absorption and acoustical correction open panel structure comprising sound absorbing material assembled in the form of a base panel member with other members disposed angularly thereon normally to the plane of said base member, said other members having at least two faces, the area of the base panel member being about 73.5% and the area of the other members being about 26.5%, substantially all the surfaces of all of the members throughout their area on both their sides being directly exposed to the direct impingement thereon of sound waves, direct and reflected.

4. In means for controlling noise absorption and for acoustical correction, a horizontally disposed sound absorbing base panel member having substantially vertically disposed thereon side panel members, said base panel member and said side members providing an open box-like structure, the area of said base panel member being of a magnitude in proportion to the magnitude of the total area of the side panel members so that the sum of the noise reduction coefficients of the 256 and 512 frequency cycles of sound waves is substantially equal to that of the sum of the noise reduction coefficient of the 1024 and 2048 frequency cycles thereof in controlling the powerful low cycles together with that of the weaker cycles in providing correction and preventing distortion of the sound waves.

5. In a structure for controlling sound absorption and for acoustical correction, a substantially horizontally disposed sound absorbing base panel member having assembled therewith substantially vertically disposed side panel members, said base panel member and said side panel members constituting said structure as shallow, open and box-like in form, the area of said base panel member being of the magnitude of 60% to 85% and the total area of said side panel members being of the magnitude of 40% to 15% of the total area of said structure, said shallow, open box-like structure exposing substantially all surfaces of all said panel members throughout their area on both their sides directly to the direct impingement thereon of sound waves, direct and reflected, in producing an equating of the sum of the noise reduction coefficients of the 256 and 512 frequency cycles of the sound waves with that of the sum of the noise reduction coefficients of 1024 and 2048 frequency cycles of the sound waves.

6. In means for controlling noise absorption and for acoustical correction by absorption of sound waves, comprising a structure having a substantially horizontally disposed sound absorbing base panel member, having mounted thereon substantially vertically disposed sound absorbing side panel members, the said base panel member and said side panel member thereby constituting an open box-like structure, the area of the base member being about 73.5% and the area of the said side panel members totaling about 26.5% of the total surface area of the said structure in causing the sum of the noise reduction coefficients of the 256 and 512 frequency cycles of the sound waves to substantially equal frequency cycles thereof.

7. An acoustical panel unit comprising panels formed of sound absorbing material disposed in the form of a shallow open box-like structure having a base member and lateral walls disposed on said base member, the area of said lateral walls being less than that of said base member and having substantially all surfaces of said base and lateral walls throughout their area on both their sides directly exposed to the direct impingement thereon of sound waves, direct and reflected.

8. An acoustical panel unit comprising panels formed of sound absorbing material disposed in the form of a shallow open box-like structure, the larger face area of said box being related to the area of the side walls thereof in ratio of the range of 60% to 85% and to the range of 40% to 15% respectively and having substantially all surfaces of said larger face area and side walls throughout their area on both their sides directly exposed to the direct impingement thereon of sound waves, direct and reflected.

9. An acoustical panel structure comprising an anchoring means fixed in the ceiling; and an acoustical panel unit suspendedly mounted thereon, said unit comprising panels formed of sound absorbing material disposed in the form of a shallow open box-like structure and having substantially all surfaces of said shallow box-like structure throughout their area on both their sides directly exposed to the direct impingement thereon of sound waves, direct and reflected.

10. An acoustical panel structure comprising a lighting fixture outlet box mounted in the ceiling; and an acoustical panel unit suspendedly mounted thereon, said unit comprising panels formed of sound absorbing material disposed in the form of a shallow open box-like structure and having substantially all surfaces of said shallow box-like structure throughout their area on both their sides directly exposed to the direct impingement thereon of sound waves, direct and reflected.

11. An acoustical panel structure comprising a lighting fixture outlet box mounted in the ceiling; an acoustical panel unit suspendedly mounted thereon, said acoustical panel unit comprising panels formed of sound absorbing material disposed in the form of a shallow open box-like structure, the larger face area of said structure being related to the lesser face area thereof in the ratio of the range of 60% to 85% and to the range of 40% to 15% respectively and having substantially all surfaces of said faces throughout their area on both their sides directly exposed to the direct impingement thereon of sound waves, direct and reflected.

12. An acoustical panel structure comprising a lighting fixture outlet box mounted in the ceiling; a bar supported thereby; resilient means having one end portion suspended from said bar; and an acoustical panel unit engaged by the other end, said unit comprising panels formed of sound absorbing material, said panels being arranged in planes horizontally and vertically angularly positioned with respect to each other in open box-like form.

13. An acoustical panel structure comprising a mounting wall; a lighting fixture outlet box mounted in the mounting wall; a bar supported thereby; resilient means having one end portion suspended from said bar; and an acoustical panel unit engaged by the other end portion of said resilient means, said unit comprising material disposed in the form of a shallow box-like structure and having spacing posts mounted on the acoustical panel unit and bearing against said mounting wall in holding the acoustical unit in spaced parallel relation to the mounting wall.

14. The controlled noise absorption and acoustical correction open panel structure comprising a ceiling; a lighting fixture outlet box mounted in the ceiling; a lighting fixture of a general box-like structure cross-sectionally considered, having a rectangular-like frame secured to said lighting fixture; air openings in the upper portion of said lighting fixture for the passage of heated air therethrough together with sound waves; and an acoustical panel unit comprising panels formed of sound absorbing material disposed in the form of a shallow box-like structure having an opening centrally thereof and mounted on said lighting fixture substantially all surfaces of said acoustical panel unit throughout their area on both their sides being directly exposed to the direct impingement thereon of sound waves, direct and reflected.

15. An acoustical panel structure comprising mounting wall; a lighting fixture outlet box mounted in the mounting wall; a lighting fixture of general box-like structure cross-sectionally considered having a circumbasal lip; a rectangular-like frame secured to said lighting fixture; an acoustical panel unit comprising panels formed of sound absorbing material disposed in the form of a shallow box-like structure having an opening centrally thereof, the edges of which bear upon said circumbasal lip; and leveling means comprising resilient means having one end portion suspended from said rectangular-like frame and the other end portion of said resilient means supportingly engaging said acoustical panel unit, and posts mounted on said acoustical panel unit and bearing against said mounting wall in resisting said resilient means in providing for said acoustical panel unit to be maintained in parallel relation to said mounting wall.

16. An acoustical panel structure comprising mounting wall; a lighting fixture outlet box mounted in the mounting wall; a lighting fixture of general box-like structure cross sectionally considered having a circumbasal lip and air passageways disposed in its top portion; a rectangular-like frame secured thereto to said lighting fixture; an acoustical panel unit comprising panels formed of sound absorbing material disposed in the form of a shallow box-like structure having an opening centrally thereof the edges of which bear upon said circumbasal lip; and leveling means comprising resilient means having one end portion suspended from said rectangular-like frame and the other end portion of said resilient means supportingly engaging said acoustical panel unit, and posts mounted on said acoustical panel unit and bearing against said mounting wall in resisting said resilient means in providing for said acoustical panel unit to be maintained in parallel relation to said mounting wall.

17. An acoustical panel structure comprising a lighting fixture outlet box mounted in the ceiling; a lighting fixture of general box-like structure cross sectionally considered having a circumbasal lip, said fixture being supported by said outlet box; a rectangular-like frame secured to said lighting fixture; an acoustical panel unit comprising panels formed of sound absorbing material disposed in the form of a shallow box-like structure having an opening centrally thereof the edges of which bear upon said circumbasal lip; resilient means suspended from said frame and engaging said unit; and spacer posts carried by said panel unit operatingly holding said unit against the tension of said resilient means.

18. An acoustical panel structure comprising a lighting fixture outlet box mounted in the ceiling; a lighting fixture unit of general box-like structure cross sectionally considered having a circumbasal lip, said fixture being supported by said outlet box; a rectangular-like frame secured to said lighting fixture; an acoustical panel unit comprising panels formed of sound absorbing material disposed in the form of a shallow box-like structure, the larger face area of which being related to the area of the side walls thereof in the ratio of the range of 60% to 85% to the range of 40% to 15% respectively; resilient means suspended from said frame and engaging said unit; and spacer posts carried by said panel unit operatingly holding said unit against the tension of said resilient means.

19. An acoustical panel structure comprising a suspended lighting fixture ballast housing; a panel of sound absorbing material mounted and disposed horizontally over said ballast housing; mounting arms diverging downwardly from said ballast housing; panels of sound absorbing and light reflecting material disposed on said mounting arms, said first mentioned panel and said latter panels defining an open box-like structure with substantially all surfaces thereof throughout their area on both their sides directly exposed to the direct impingement thereon of sound waves, direct and reflected.

20. An acoustical means comprising a first ceiling; lighting fixture outlet boxes mounted in said ceiling; lighting fixtures supported by said outlet boxes in spaced relation to said first ceiling; and a second ceiling formed of acoustical panels having buried therein fastening means supportingly connected to said lighting fixtures, said panels being disposed in the form of open shallow box-like structures having a base member and side walls, the area of the base being greater than that of the side walls, and having substantially all surfaces of said base and side walls throughout their area on both their sides directly exposed to the direct impingement thereon of sound waves, direct and reflected.

21. An acoustical means comprising a first ceiling; light fixture outlet boxes mounted in said ceiling; lighting fixtures supported by said outlet boxes in spaced relation to said first ceiling; a demountable second ceiling formed of acoustical shallow box-like structures having a substantially horizontally extending base panel and substantially vertically extending side panels and having buried therein fastening means supportingly connected to said lighting fixtures; and bridging panels extending between said box-like structures, the substantially vertically disposed side panels of said box-like structures thereby extending upwardly into the space between said first ceiling and said second ceiling in providing sound entrapping baffle means therein.

22. An acoustical panel structure comprising a lighting fixture outlet box mounted in the ceiling; a bar supported thereby; resilient means suspended from said bar; and an acoustical panel unit supportedly engaged by a fastening means buried in said unit and connected to said resilient means, said unit comprising panels formed of sound absorbing material in spaced relation to the ceiling, said panels being disposed in planes horizontally and vertically angularly positioned with respect to each other and having spacing posts mounted on the unit holding the horizontal panel in spaced relation to the ceiling against the force of said spring.

References Cited in the file of this patent

UNITED STATES PATENTS

| | | |
|---|---|---|
| 1,910,160 | Gorman | May 23, 1903 |
| 1,869,367 | Dean | Aug. 2, 1932 |
| 2,112,631 | MacDonald | Mar. 29, 1938 |
| 2,160,638 | Bedell | May 30, 1939 |
| 2,218,992 | Munroe | Oct. 22, 1940 |
| 2,270,268 | Chambers | Jan. 20, 1942 |
| 2,376,715 | Naysmith | May 22, 1945 |
| 2,488,555 | Pare | Nov. 22, 1949 |
| 2,502,016 | Olson | Mar. 28, 1950 |
| 2,610,695 | Grue | Sept. 16, 1952 |
| 2,659,807 | Wakefield | Nov. 17, 1953 |
| 2,715,449 | Lemmerman | Aug. 16, 1955 |

FOREIGN PATENTS

| | | |
|---|---|---|
| 721,802 | Germany | July 22, 1942 |
| 593,235 | Great Britain | Oct. 10, 1947 |
| 630,311 | Great Britain | Oct. 11, 1949 |